INVENTOR.
James M. Forner

March 12, 1968 J. M. FORNER 3,372,742
APPARATUS FOR HEAT EXCHANGE OF GRANULAR SOLIDS
Filed Dec. 8, 1965 2 Sheets-Sheet 2

INVENTOR.
James M. Forner
BY Fredrick H. Braun
ATTORNEY

United States Patent Office 3,372,742
Patented Mar. 12, 1968

3,372,742
APPARATUS FOR HEAT EXCHANGE OF GRANULAR SOLIDS
James M. Forner, Springfield Township, Hamilton County, Ohio, assignor to The Procter & Gamble Company, Cincinnati, Ohio, a corporation of Ohio
Filed Dec. 8, 1965, Ser. No. 512,367
2 Claims. (Cl. 165—96)

ABSTRACT OF THE DISCLOSURE

An apparatus for heating or cooling granular material in which a plurality of finned tubes are mounted transversely in a heat transfer chamber. Flow control means are provided at the bottom outlet of the heat transfer chamber to restrict and control flow of granules through the apparatus as desired in order to maintain the heat exchange chamber in full or choked condition. Continuous flow of granules is maintained in order to achieve the desired degree of heat exchange.

---

This invention relates to an apparatus for obtaining effective heat exchange in the heating or cooling of granular solids. More particularly, the apparatus relates to a finned tube type heat exchanger having outlet flow control means.

The transfer of heat to or from granular solids in various manufacturing processes has long been a difficult problem. Such materials are variously referred to as powders or granules. The use of hot or cold surfaces for this purpose has generally been ineffective because the granular solids form a heat insulating barrier between the heating or cooling surface and the body of the granules which are not in direct contact with said surfaces.

Equipment arrangements in which a large amount of effective heat transfer surface is obtained at low cost have also been difficult to design. Consequently, more manufacturing installations requiring such heating or cooling of granular solids have of necessity resorted to equipment systems which involve intimate mixing of the granules with a heated or cooled gas (usually air) to effect heat transfer between the granules and the contacting gas. These systems are relatively expensive since they involve air solids mixing systems, heating or cooling equipment for the gas and equipment for finally separating the granular solids from the gas. The operation of this equipment often results in damage to the granules, material losses in the collection equipment and fouled heat transfer surfaces.

It is a principal object of this invention to obviate the above difficulties.

Another object of the present invention is the provision of an apparatus which will efficiently transfer heat between a heating or cooling surface and a mass of granular solids of suitable flowability. Examples of such granular solids are soap or detergent granules and granulated sugar.

The nature and substance of the invention can be summarized briefly as the provision of a device for attaining the aforesaid objectives comprising a heat exchange chamber having a top inlet and a bottom outlet. A plurality of finned tubes are mounted horizontally and parallel to each other in close relationship within the heat exchange chamber. A flow control device is provided at the bottom outlet by which the rate of material flow through the heat exchanger is controlled.

Granular material is supplied to the inlet at a rate equal to the flow rate established at the bottom outlet to maintain the heat exchanger in a filled or "flooded" condition. In this flooded condition the mass of granular material moves down slowly by gravity crosswise to the finned tubes and substantially parallel to the surfaces of the fins. The granules are maintained in effective contact with both the finned and tubular surfaces and are effectively heated or cooled as they pass through the heat exchanger by gravity from top to bottom. Granular materials of normal flowability will effectively transit the heat exchanger with essentially no stoppages of material due to bridging or packing.

While the specification concludes with claims particularly pointing out and distinctly claiming the subject matter regarded as forming the present invention, it is believed the invention will be better understood from the following description taken in connection with the accompanying drawings in which:

Figure 1:
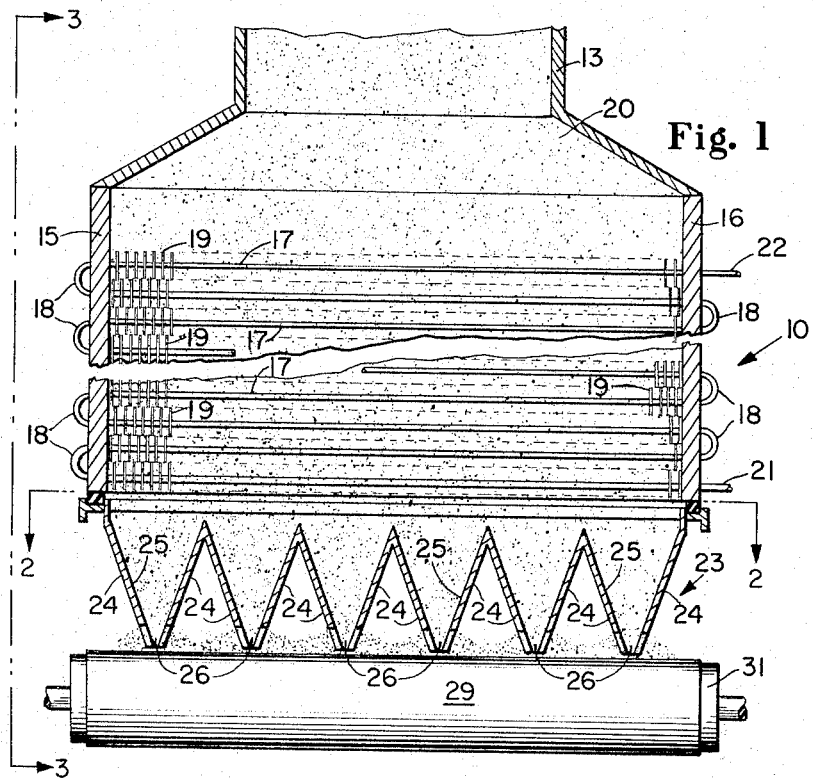
FIGURE 1 is a fragmentary side elevation in cross section showing the heat exchanger in flooded condition.
Figure 2:
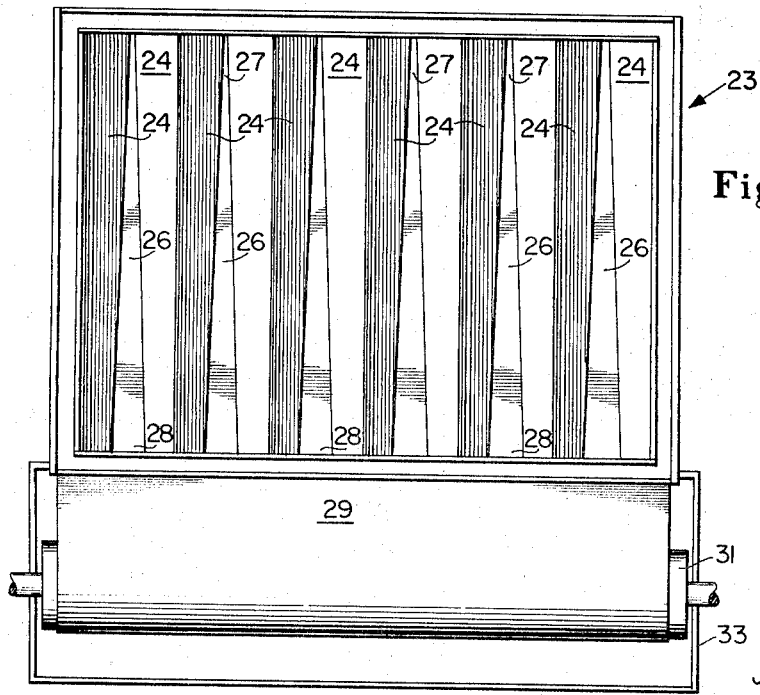
FIGURE 2 is a plan view in cross section taken on the line 2—2 of FIGURE 1 showing the details of a flow control device.
Figures 3, 4, 5:
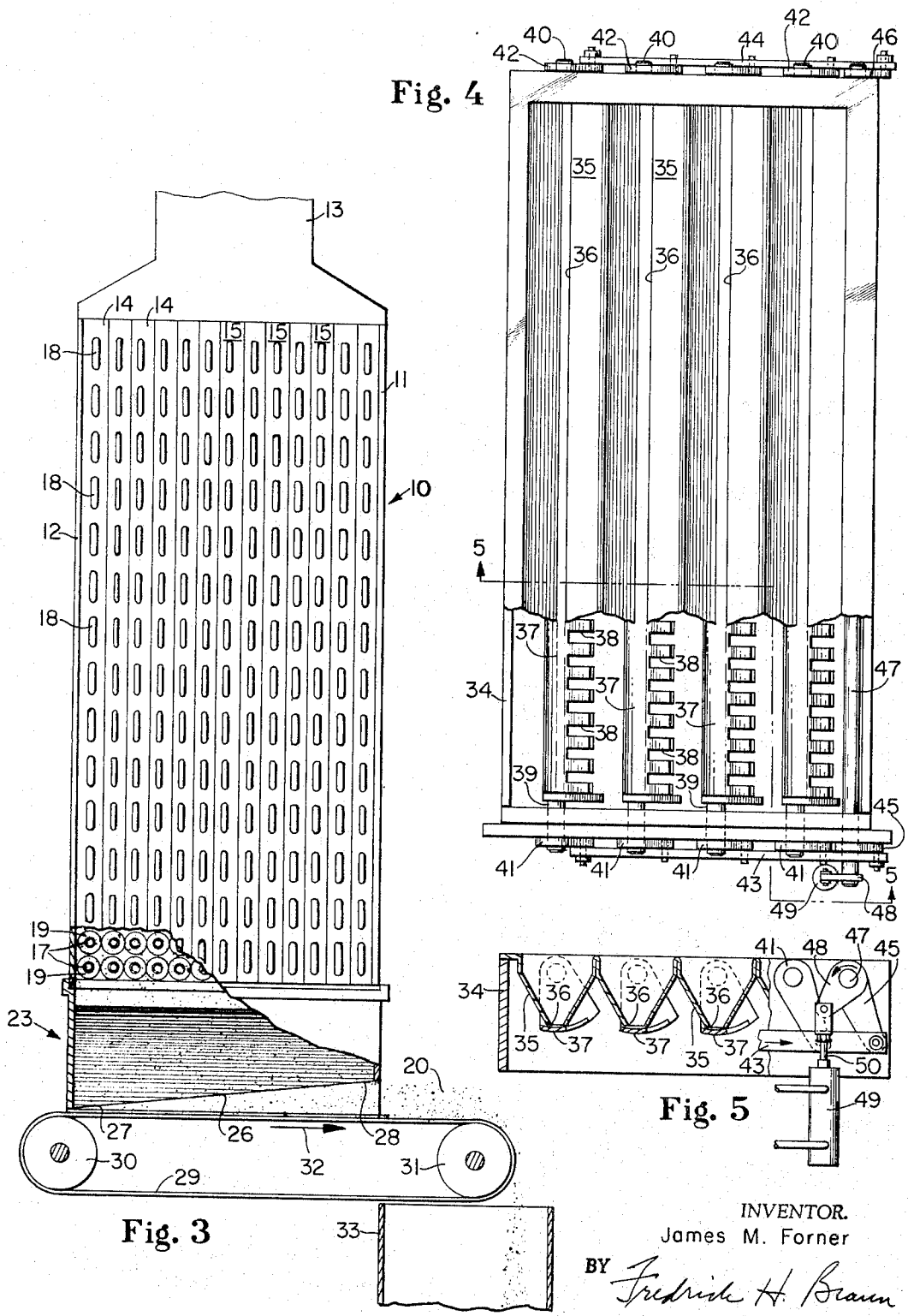
FIGURE 3 is an end elevation partly broken away taken on the line 3—3 of FIGURE 1 showing further details of the heat exchanger and the flow control device.
FIGURE 4 is a fragmentary plan view of an alternate device for controlling flow through the heat exchanger.
FIGURE 5 is a fragmentary elevation in cross section taken on the line 5—5 of FIGURE 4.

One form of the device for practicing the present invention is illustrated in FIGURES 1, 2 and 3. The heat exchanger 10 includes an enclosure having end walls 11 and 12 and an inlet opening 13. A plurality of tube banks 14 are mounted in snug fitting relationship to complete the enclosure between the side walls 11 and 12. Each of the tube banks 14 has opposed end frame elements 15 and 16. As seen in FIGURE 3, the end frame elements 15 are fitted together in snug relationship to form one side wall between the end walls 11 and 12. The end frame elements 16 are similarly fitted to complete the enclosure for the heat exchanger 10. The number of tube banks 14 can be varied to suit any particular need. One tube bank 14 will be sufficient when small volumes of granular material are involved although a plurality will more often be employed for most practical applications.

A plurality of tubes 17 are mounted transversely between the end frame elements 15 and 16 such that the end of each tube is connected to an adjoining tube by an elbow 18 to form a continuous passageway for heat exchange fluid. Radially projecting fins 19 are provided in closely spaced relationship along the length of each tube 17. As shown in FIGURES 1 and 3, the fins 19 are in staggered relationship on adjacent tubes 17 of each bank 14. In a preferred construction, the fins 19 are sufficiently large in diameter such that their peripheries overlap in projected end elevation (FIGURE 3) but they are not in contact. As a consequence of this fin and tube arrangement, the granular material 20 flowing downwardly in the heat exchanger 10 is exposed to a maximum heat exchanger surface area thus providing an efficient and effective heat transfer path for the granular material 20.

Heat transfer in the exchanger 10 is effected by a fluid heat exchange medium, e.g., water, steam, brine, ammonia, haloalkane or the like, which is passed from the inlet 21 through the tubes 17 of each bank 14. The heat exchange medium is discharged from each bank 14 at the outlet 22. In a prefererd construction, each bank 14 is provided with a separate heat exchange medium source, although a common header at the inlets and outlets can be provided.

For best results the heat exchanger 10 is preferably maintained in flooded condition. That is, the heat exchanger is filled to a level maintained above the tubes 17 as illustrated by way of example in FIGURE 1. The granular material moves downwardly by gravity to obtain effective contact of the granules with the fin and tube heat exchange surfaces as the mass of granular material moves down gradually. In order to maintain a flooded condition it is necessary, in fact, it is essential, that the outflow at the bottom of the heat exchanger be controlled so that it balances the inflow of granular material at the top.

FIGURES 1, 2 and 3 illustrate a granular flow control device 23 which includes a plurality of angular walls 24 which form a plurality of V-shaped troughs 25. Each trough 25 has a narrow outlet opening 26 at the bottom thereof. The long dimension of the outlet openings 26 is substantially transverse to the tubes in a preferred construction. As best seen in FIGURE 2, the outlet openings 26 are tapered so that they are relatively narrow as at 27 and gradually become wider as the other end 28 is approached. The purpose of the tapered opening will be apparent in the ensuing description.

An endless belt 29 is mounted over the sheaves 30 and 31. The belt 29 is continuously moved by a suitable drive (not shown). The upper flight of the belt 29 is immediately below and in close proximity to the outlet openings 26. The belt 29 moves in the direction indicated by the arrow 32 in FIGURE 3 so that its upper flight moves from the narrow end 27 of the opening 26 to the wide end 28. Thus a narrow ribbon of granular material is initially deposited at the narrow end 27 of the opening 26. This ribbon becomes progressively wider and taller as the belt moves forward so that granular material is uniformly deposited on the belt as the belt traverses the length of the several troughs 25. This insures uniform flow of granular material downwardly in the heat exchanger to obtain substantially uniform temperature of the granules at any cross section therein. The material 20 on the belt 29 falls by gravity into a chute 33 as the belt 29 moves over the sheave 31 whereby the granules are available for further processing.

Another form of flow control device to maintain a flooded condition in the heat exchanger is illustrated in FIGURES 4 and 5. The frame 34 of the flow controller is illustrated in FIGURE 5. This is normally mounted beneath the heat exchanger 10 in much the same way as the flow control device 23 of the previously described embodiment. In the embodiment of FIGURES 4 and 5, the main frame is provided with a plurality of funnels 35 beneath the heat exchanger with each funnel 35 having a bottom opening 36 which is of substantially constant width. The openings 36 have their long dimension substantially transverse to the tubes in a preferred construction.

A clam shell gate 37 having a series of spaced slots 38 (FIGURE 4) is mounted for pivotal movement by means of the stud shafts 39 and 40 beneath each of the openings 36. A mechanism is provided for simultaneously pivoting each of the gates 37 to control flow through the openings 36. The mechanism is designed to provide uniform flow of granular material downwardly in the heat exchanger to obtain substantially uniform temperature of the granules at any cross section therein. This mechanism consists of a series of arms 41 and 42 secured to each of the shafts 39 and 40, respectively. The arms 41 are each pivotally connected to a common link member 43 and the arms 42 are each commonly pivoted to a link member 44. The ends of link members 43 and 44 are pivotally attached to the actuating arms 45 and 46, respectively. The actuating arms 45 and 46 are interconnected by the cross shaft 47 extending from one side of the control member to the other. The cross shaft 47 has an actuating arm 48 secured to one end, said arm 48 being controlled by the double-ended, double-acted air cylinder 49. Thus, in the position illustrated in FIGURES 4 and 5, the openings 36 are closed by the gates 37. Flow can be initiated by actuating the double-acting air cylinder 49 to move the rod 50 upwardly thus simultaneously rotating the gates 37 so that the slots 38 are moved into position beneath the openings 36.

In this latter position, flow through the heat exchanger is initiated as the slots 38 are designed to permit flow such that the flooded condition of granules in the heat exchanger as illustrated in FIGURE 1 is obtained. The width of the slots are designed to achieve this condition. However, the width will also depend on other factors such as the flow rate, the physical size of the heat exchanger, the character of the granular material, etc.

The previously described devices may be used to carry out the method of this invention by which flow is controlled through the heat exchanger to obtain a heat transfer coefficient of between about 5 and about 25 B.t.u./hr./° F./sq. ft. (area includes fins and tubes) depending, of course, on the conductivity characteristics of the granular solids being heated or cooled and the character of their surface. The exchanger is well suited for the efficient handling of solids of the agglomerating, pressure sensitive (e.g., granules that tend to lump or brake together when under the influence of pressure), sticky type such as soap or detergent granules, sodium tripolyphosphate granules, sugar granules and the like, without the clogging and other difficulties frequently resulting from the handling of granules having these characteristics. The heat exchanger works very effectively for heating or cooling granules ranging in size from about 14 to about 200 mesh.

In a preferred construction, tubes with 3 to 6 fins per inch are used although the number of fins depends entirely on the type of material being treated. Coarse materials, or materials having a tendency to lump generally will require wider fin spacing than relatively fine free-flowing granules similar to industrial fine sugar. The cross section of the heat exchanger should be as small as possible to maximize the flow velocity of the granules. Under no circumstances, however, should the velocity assume such proportions that voids will develop within the heat exchanger core. The height of the unit is determined by the total amount of heat to be exchanged and the temperature difference between the granular material and the heat exchange media.

The effective flow of material through the heat exchanger combined with efficient heat transfer between the granular material and the heat transfer surfaces is novel and nonobvious. This unexpected result is obtained by operating the heat transfer section in a completely filled (flooded) condition as opposed to an open flow, free-falling tumbling condition. This results in an operation wherein the granular material completely covers and is in contact with all of the heat transfer surface. The result of operating in this fashion is that the heat transfer surface is substantially 100% effective.

Another important factor in the successful practice of the invention is that the movement of solid material from one fin or tube surface to the next surface below as it flows downwardly through the heat exchanger provides a discontinuity which repeatedly brings uncooled or unheated portions of the granular material into direct contact with heat transfer surfaces. Conversely, granules which have been heated or cooled by heat transfer surfaces move through random flow patterns into the body of the granular material where heat may be transferred between them and other granular materials. This action effectively overcomes the insulating barrier mentioned previously by providing the equivalent of convective movements within the granular material.

The finned tubes in the arrangement specified provide a unique combination of several advantages which are essential to the successful result. First, they make possible a large amount of low cost heat transfer surface in a relatively small volume of heat transfer section. Secondly, the phenomena known as packing and bridging which often occurs in bodies of granular material is prevented or greatly reduced. The weight of granular material when contained in a chamber is effectively supported by frictional engagement of the granules to vertical or near vertical surfaces. This is particularly true when granules are moving downward in a body in moving friction with the vertical surfaces. The net effect is to prevent the weight of granular material from exerting pressure against granules at a lower point. This prevention of pressure preserves a relatively loose, unpacked condition of granules which is conducive to flowability. The beneficial effect of such vertical surfaces in promoting flowability increase with the amount of such vertical surfaces and the closeness of such vertical surfaces to all points within the chamber. This is true up to a point where the surfaces themselves become close to the extent that large particles or lumps span the available opening. The fins of the finned tubes, arranged in the manner described, effectively secure the favorable flow condition described above by providing a large number of vertical surfaces suitably interspersed throughout the heat transfer chamber and which effectively minimize pressure from developing in specific local places in the mass of granular material.

Another advantage of the arrangement of finned tubes described herein is that it makes possible the distribution of a large amount of heat transfer surface across the cross sectional plan of the heat transfer section and at the same time allows maintenance of sufficient spacing between surfaces to provide substantially optimum flow conditions. The use of finned tubes effectively permits the installation of large amounts of surface area into a given space and actually aids the flow of the granular material by means of the vertical supporting surfaces. Plain tubes in a similar arrangement provide much less heat transfer surface and only a small amount of vertical surface to support the granular material by frictional force. If plain tubes are used in the heat exchanger spaced sufficiently close for effective heat transfer, the clearance between surfaces and the shape of the flow passages would be such as to be detrimental to granular material flow.

Improved effectiveness is obtained by an outlet flow controlling system which provides for substantially uniform flow across the plan cross section of the heat transfer section. Such control results in uniform flow in the upper parts of the heat transfer section and thereby provides for optimum heat transfer action in all parts of the heat exchanger.

Heat transfer effectiveness can, if desired, also be improved by vertically staggering the arrangement of the finned tubes. In the arrangement heretofore referred to in which the tubes are aligned vertically, the region of flow between the tips of the fins and the area immediately adjacent is less effective because granular material which is descending in this area has less heat transfer surface to contact. The reduced heat transfer which thereby results and the higher rate of flow which also occurs due to the absence of retarding vertical surface results in a degree of short circuiting of granular material past the heat transfer surface. An arrangement in which the finned tubes are vertically staggered effectively prevents such short circuiting. Such a staggered arrangement is only slightly more complicated to construct than the aligned arrangement of tubes.

The following examples illustrate the effectiveness of the device in the cooling of two granular materials which are widely different in their physical characteristics. No clogging agglomeration or sticking problems were encountered. A simple slide gate flow controlling device was used for both the granulated sugar and the sodium tripolyphosphate granules. This type of granular material flow control was feasible since the heat exchanger consisted of only one tube bank. When 40–60 mesh spray dried synthetic detergent granules of the type described in U.S. Patent 2,486,922, Bruce Strain, are treated in a manner similar to the treatment given the sodium tripolyphosphate granules, similar efficient cooling results are obtained.

| Unit Description | Heat exchanger consisting of one tube bank having 22 vertically aligned tubes, each tube being 4¾ inches long, 5 fins per inch, 11.0 sq. ft. of cooling surface, unit running full | | | Heat exchanger consisting of one tube bank having 6 vertically aligned tubes, each tube being 5 inches long, 3 fins per inch, 1.97 sq. ft. of cooling surface, unit running full | | |
|---|---|---|---|---|---|---|
| Purpose | Cooling | | | Cooling | | |
| Test Number | 1 | 2 | 3 | 1 | 2 | 3 |
| Heat Exchange Liquid | Water | | | Water | | |
| Average Rate (lb./hr.) | 884 | 780 | 915 | Not measured | | |
| Initial Temperature (° F.) | 56 | 57.4 | 56 | 56.0 | 56.5 | 56.5 |
| Discharge Temperature (° F.) | 64 | 65.6 | 65.5 | 56.5 | *56.5 | *56.5 |
| Solids Material | Granulated Sugar (48 to 150 mesh) | | | Granular Sodium Tripolyphosphate (28 to 100 mesh) | | |
| Average Total Rate (lb./hr.) | 852 | 1,145 | 1,333 | 418.5 | 262.9 | 360 |
| Initial Temperature (° F.) | 108 | 101 | 114 | 97 | 101 | 88 |
| Discharge Temperature (° F.) | 78 | 79 | 89.5 | 88 | 85 | 97 |
| Overall Coefficient "U" (B.t.u./hr./ft.²/° F.) (Based on total area) | 21.9 | 24.6 | 21.9 | 24.8 | 21.1 | 16.3 |

*NOTE.—The apparent lack of cooling water temperature rise is due to the fact that the temperature change which necessarily had to occur was too small to be read on the thermometer used. This effect resulted from the large flow of water compared to the flow of sodium tripolyphosphate and the higher specific heat of water.

In addition to the previously described device for controlling flow through the heat exchanger, it is possible to accomplish similar results by the use of slide gates, feeder valves or any other valve type gate attached to the bottom of the heat exchanger to maintain it in flooded condition. The two devices heretofore described have been found particularly effective for specific cooling applications. Specifically, the device of FIGURES 1, 2 and 3 have been found very useful for the cooling of hot spray dried synthetic detergent granules. On the other hand, the device of FIGURES 4 and 5 is better suited for the cooling of industrial granulated sugar.

While particular embodiments of the invention have been illustrated and described it will be obvious to those skilled in the art that various changes and modifications can be made without departing from the spirit and scope of the invention and it is intended to cover in the appended claims all such changes and modifications that are within the scope of this invention.

What is claimed as new is:

1. A heat exchanger apparatus for granular material comprising a heat exchanger chamber having a top inlet and bottom outlet, a plurality of tubes arranged substantially horizontally across said heat exchanger chamber, each of said tubes being provided with a plurality of spaced radially extending fins to substantially increase the heat exchange surface, means in the bottom outlet to control flow through said heat exchanger such that granular material passing therethrough is maintained in flooded condition therein, said flow control means comprising at least one V-shaped funnel having a narrow elongated bottom opening of substantially uniform width, a slotted clam shell gate beneath said opening and means for moving said gate from a first position wherein flow is stopped to second position wherein flow through said heat exchanger is maintained in flooded condition.

2. A heat exchange apparatus as claimed in claim 1 wherein the bottom opening in said V-shaped funnel is placed beneath said tubes so that the long dimension of the bottom opening is substantially transverse to said tubes.

References Cited
UNITED STATES PATENTS

| | | | |
|---|---|---|---|
| 2,703,225 | 3/1915 | Cooper | 165—96 |
| 2,333,089 | 11/1943 | Burkhardt | 34—177 |
| 2,761,652 | 9/1956 | Broman | 165—95 |
| 3,175,299 | 3/1965 | Boucher | 34—4 |

ROBERT A. O'LEARY, *Primary Examiner.*

CHARLES SUKALO, *Examiner.*